Dec. 10, 1935.  W. H. BACHELDOR  2,023,910
FILTER LEAF STRUCTURE
Filed Feb. 27, 1933   3 Sheets-Sheet 1
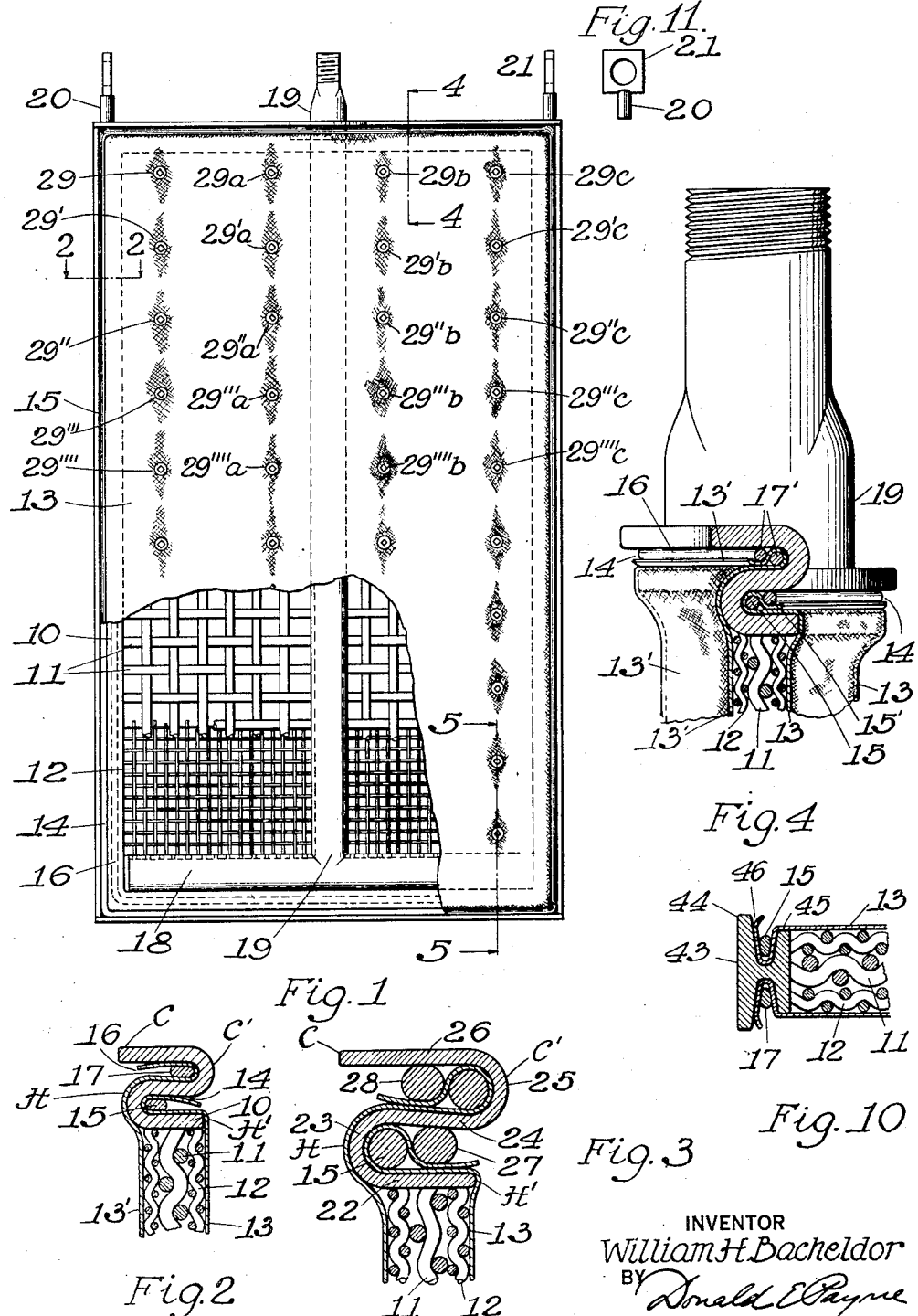

Dec. 10, 1935.  W. H. BACHELDOR  2,023,910
FILTER LEAF STRUCTURE
Filed Feb. 27, 1933  3 Sheets-Sheet 2

Shelf when vertical "button" spacing exceeds horizontal.

Channel when horizontal "button" spacing exceeds vertical.

INVENTOR
William H. Bacheldor
BY Donald E. Payne
ATTORNEY

Dec. 10, 1935. W. H. BACHELDOR 2,023,910
FILTER LEAF STRUCTURE
Filed Feb. 27, 1933 3 Sheets-Sheet 3

INVENTOR
William H. Bacheldor
BY
Donald E. Payne
ATTORNEY

Patented Dec. 10, 1935

2,023,910

UNITED STATES PATENT OFFICE 2,023,910

FILTER LEAF STRUCTURE

William H. Bacheldor, Wood River, Ill., assignor to Standard Oil Company, Chicago, Ill., a corporation of Indiana Application February 27, 1933, Serial No. 658,748

3 Claims. (Cl. 210—195)

This invention relates to filter leaf structure and it pertains more particularly to the structure of filter leaves designed for use in continuous closed filters, such as those used in propane dewaxing plants.

When a filtration operation involves the use of extremely volatile diluents or gases, particularly when those diluents or gases are flammable, explosive, toxic or expensive cake discharge should be effected in a closed filter. Preferably the closed filter should not contain moving parts in the filter casing, particularly those which involve the use of shafts journaled through the casing, because it is very difficult to prevent diluent losses around said shafts. In the filtration of solidified wax from diluted oil at temperatures of about −40° F. it has been practically impossible to operate a closed filter continuously because of the difficulty in removing the wax cake from the filter leaf; scrapers and the like tend to rub the wax into the pores of the filter cloth. The object of this invention is to provide a means whereby a wax filter cake may be dislodged from a filter leaf without opening the casing and without using mechanical scrapers. A further object is to provide a filter leaf structure which will give maximum filter area per unit of filter volume. A further object is to avoid the formation of pockets or shelves in the filter casing which might interfere with cake discharge. A further object is to provide vertical channels between adjacent filter leaves. Still another object is to provide a method of attaching the filter medium to the leaf structure without damaging medium and causing leakage.

The dewaxing of mineral oil is for the purpose of producing low pour point lubricants and the filtrate is therefore of primary importance. If the object were merely to recover paraffin wax, slight imperfections in the filter cloth would be of no great moment, since the loss of wax therethrough would be negligible. In a dewaxing process, however, an extremely small amount of wax may raise the pour point of a lubricant as much as 10° F. to 40° F. and it is therefore of extreme importance that the filter cloth be absolutely tight. It has been found, particularly in propane dewaxing systems, that the edges of the filter cloth cannot be sewed together because the minute holes formed by sewing allow the passage of enough wax to seriously raise the pour point of the finished oil. An attempt has been made to protect sewed seams by compositions such as rubber, lacquer, varnish, etc., but it has been found that such expedients do more harm than good, apparently because they stiffen the fiber at the joints and cause cracking on flexure. An object of the invention is to seal the edges of a filter element so that there can be absolutely no leakage or filtrate contamination.

In practicing the invention the filter leaf frame is provided with an annular groove and the edges of the filter element are securely wedged into this groove by a flexible packing material, such as cotton or asbestos rope. By using an S-shaped flange around the filter leaf the opposed filter elements may be in this manner, secured in separate grooves. By slightly tapering these grooves wedging action may be obtained so that tension on the filter element will cause the edge to be clamped even more tightly, thereby absolutely preventing leaks.

When large filter leaves are employed and the cake is discharged by blowing back, the outwardly bulging filter media will be forced against each other unless the leaves are widely spaced. For this reason it is common practice to "button" the filter media at frequent intervals whereby this bulging of the filter cloth may be greatly restricted, but there will necessarily be ridges of bulged filter membrane between the rows of buttons. Heretofore, the buttons have been spaced over the leaf in a haphazard fashion, the buttons in a horizontal line being frequently closer together than the buttons in a vertical line, in which case the horizontal bulging predominates and forms shelves which tend to catch and hold the filter cake and prevent its ready discharge. One of the features of this invention is the spacing of the buttons whereby the predominating bulges in the filter element are vertical so that there will be no projecting shelves but rather there will be vertical channels through which the filter cake may readily fall.

The invention will be more clearly understood from the following detailed description and from the accompanying drawings which form a part of this specification and in which—

Figure 1 is a vertical plan of the improved filter leaf with parts broken away to show its structure.

Figure 2 is a detail section taken along the lines 2—2 of Figure 1.

Figure 3 is a similar detail section showing a modified form of peripheral grooves.

Figure 4 is a vertical section taken along the lines 4—4 of Figure 1, showing how the grooves enable the filter element to be secured around the filtrate discharge pipe.

Figure 10 is another section detail of a modified periphery groove structure, and Figure 11 is a side elevation of a part of the filter leaf illustrated in Fig. 1.

Figure 5:
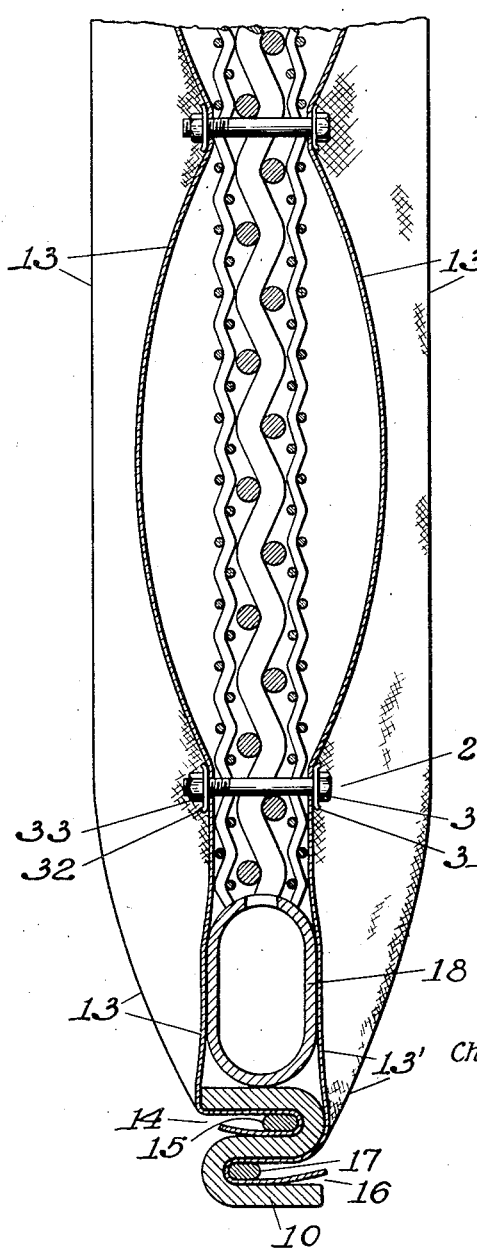
Figure 5 is an enlarged detail section taken along the lines 5—5 of Figure 1.

Referring to Figure 1, the filter leaf may consist of a peripheral frame 10 secured to a coarse screen 11. Instead of a coarse screen, suitable equivalents such as corrugated plates may be used, the element being generally described as a foraminous or reticulated supporting member which holds the filter elements apart and permits the filtrate to drain into the receiver as will be hereinafter described.

Above the coarse screen 11 there is usually a finer screen 12 for supporting the filter element 13, which is usually a canvas cloth. The supporting screen may in some cases be eliminated, and instead of using canvas, any other suitable filter element may be used. Woven metal wire may serve some purposes. Woven cloth which has been partly mercerized or treated with copper ammonium hydroxide and subsequently neutralized with acetic acid may offer certain advantages in that the warp and weft will be partially fused together, thereby preventing the spreading of the threads. The filter cloth may likewise be treated with alkali and carbon disulfide for the same purpose.

On one side of the frame there is a peripheral groove 14 and the edge of the filter element on that side of the leaf is wedged into this groove by means of a flexible wedging material 15. This wedging material may be wood or metal, and it may be in the form of strips, rods or rings, but to avoid any possible leakage past rigid wedging means due to the slight irregularity between it and the rigid frame, it is preferred to employ asbestos rope, cotton rope or other flexible material which may be driven into the peripheral groove with some distortion and which will insure firm and intimate contact of the filter element with the groove at all points. This method of attachment is referred to as a "rope locking groove", and by rope it is meant to include any flexible, extenuated material suitable for the purpose.

The peripheral frame is preferably of S-shaped cross section shown in Figure 2, the coarse screen being attached to the top or bottom of the S. If the lower part of the S forms a peripheral groove on one side of the filter leaf, the upper part thereof will form a peripheral groove on the other side of the leaf. Thus in groove 16, filter element 13' is secured by the wedging therein of cotton rope 17. The outer portion of the S projects farther than the inner; this is an important feature, since it protects the edges of the filter cloth.

At the base of the filter leaf there is a filtrate collector pipe 18, from which filtrate is removed through communicating vertical pipe 19 and suitable connections or unions to the filtrate discharge line (not shown).

In Figure 2 the upper and lower grooves formed in the frame of S-shaped section are of practically uniform width. It may be desirable to have the bottoms of these grooves slightly wider than the tops thereof, as shown in Figure 3. In this modification the base 22 of the S-shaped section is secured to the coarse screen 11. The lower rounded portion 23 of the S is slightly more than 180°, so that the middle section 24 thereof is slightly inclined toward the base section. Likewise the upper curve 25 is slightly more than 180°, so that the top 26 of the S section is slightly inclined toward the middle section and is substantially parallel to the base section. When the edge of a filter element is wedged into one of the grooves shown in Figure 3 and pressure is applied to the filter element by "blowing back", the filter element will pull the rope into the narrow part of the slot so that, with increased pressure, there will be increased wedging and a decreased tendency for the edges to become pulled out or to leak.

For maximum safety, a plurality of wedging means may be employed in each groove. These wedging means may be placed one on top of the other so that they supplement each other as shown by 15' and 17' in Figure 4. The wedging action may be increased by wedging the second rope 28 between the free edge of the filter element and the outer side of the peripheral groove, as shown in Figure 3. An excellent tightly wedged joint may be obtained in this manner which will withstand high pressure and which will not permit the minutest leakage. Figure 4 shows how the peripheral grooves run around the filter discharge pipe 19, thus solving the problem of securing filter elements to leaves at this difficult point.

As hereinabove stated, the filter elements are held together at spaced points by means of "buttons" 29. These buttons consist of bolts 30 which extend through aligned holes in the opposed filter elements and intermediate screens, leakage being prevented by the use of suitable washers 31 and 32 which are tightly clamped against the filter elements by nuts 33. The spacing of these buttons is illustrated in Figure 1, where it will be seen that buttons 29, 29a, 29b and 29c in the horizontal plane are spaced farther apart than the buttons 29, 29', 29'', 29''', etc. in a vertical plane. The distance between buttons 29 and 29a is preferably about ten or eleven inches, while the distances between buttons 29, 29', 29'', etc. is only about eight or nine inches. Consequently, when the filter leaves are blown back for discharge of filter cake, there is a series of pronounced bulges between buttons 29 and 29a, 29a and 29b, etc. There is, of course, slight bulging between buttons 29' and 29'', etc., but this bulging is relatively minor.

Figure 6:
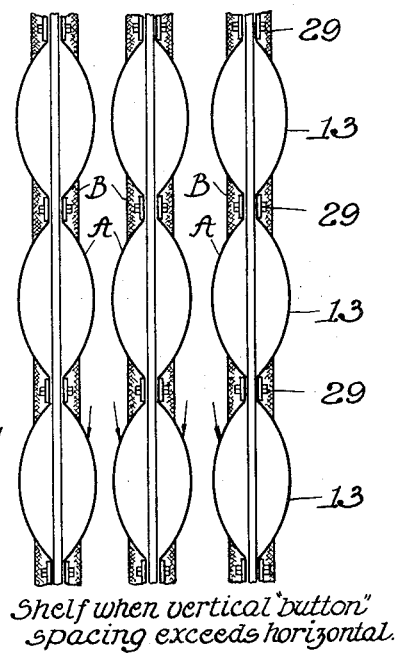
Figure 6 is a diagrammatic representation of a filter element wherein the vertical spacing of buttons exceeds the horizontal spacing.
Figure 7:
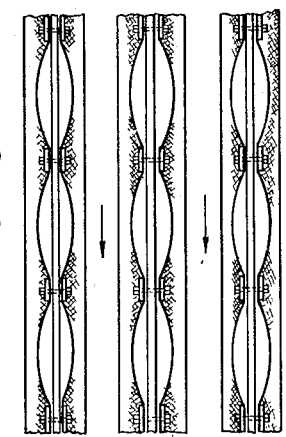
Figure 7 is a similar diagrammatic section showing the channels which are formed when horizontal button spacing exceeds the vertical spacing.

The importance of button spacing will be apparent by comparing Figures 6 and 7. Figure 6 represents a plurality of filter leaves wherein the vertical button spacing exceeds the horizontal. It will be observed that pronounced horizontal bulges A are formed which almost touch each other and which effectively prevent satisfactory cake discharge. In Figure 7 a similar sketch shows the effect of having the horizontal button spacing instead of the vertical. In this case there are no appreciable shelves or pockets which might interrupt the cake discharge.

Figure 8:
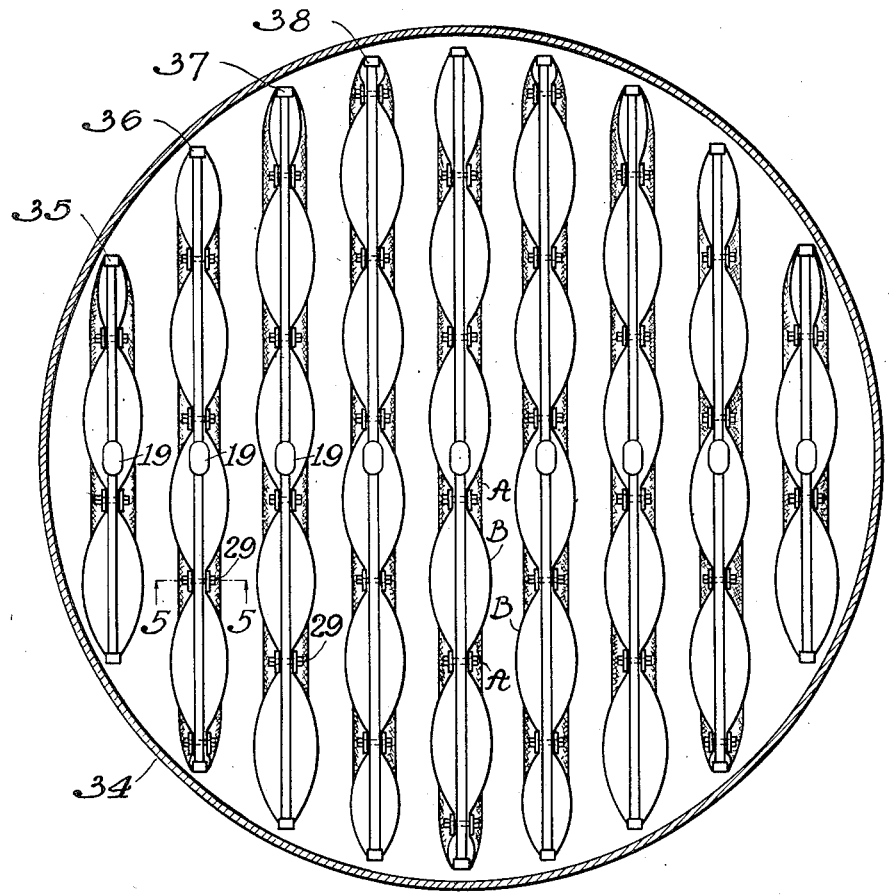
Figure 8 is a horizontal section taken through a filter casing in which the invention is employed.
Figure 9:
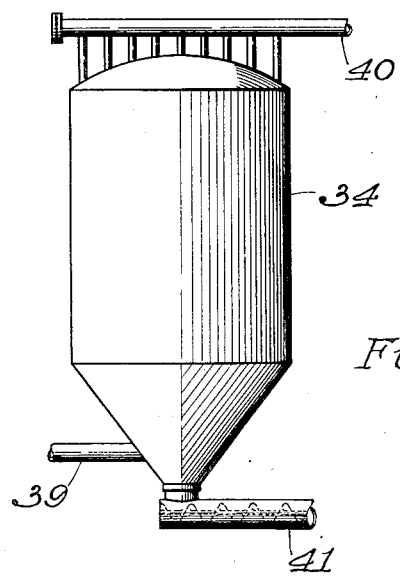
Figure 9 is a vertical elevation on a small scale of the exterior of a closed continuous filter for which the improved leaves are particularly designed.

Figure 8 shows a cross section of a closed filter 34 wherein the filter leaves are spaced about five or six inches apart, wherein the maximum filter bulges are vertical instead of horizontal, and wherein the button spacing is staggered so that the maximum bulge of one filter is opposed to the buttons of the adjacent filter. Closed filters of this type are illustrated in Figure 9 and are operated by introducing a slurry at the base of the filter through pipe 39, removing filtrate from the top thereof through pipe 40 until a cake has been built up on the leaves, then withdrawing the slurry from the casing through pipe 39, and discharging the filter cake by blowing back through the filter leaves, the discharge cake being removed from the base of the filter by means of screw conveyor 41.

As hereinabove stated, a feature of the invention is the use of a periphery groove member in which the outer portions are wider than the inner portions or the filter leaf per se, so that the filter cloth is protected. In Figures 2 and 3 it will be noted that the upper portions C and C' extend outwardly a little farther than the filter element on portions H and H'. This same advantage may be obtained in other ways; for instance, in the modification shown in Figure 10 wherein the outer frame 43 of the filter is in somewhat the shape of a rail section or small I-beam. The base 44 of this section extends outwardly farther than the top 45 of this section and the space 46 between the top and bottom of the section forms a periphery groove into which a filter element is wedged. The invention is not limited to any specific structure but contemplates the use of a periphery frame wherein the outer section projects far enough to protect the filter element.

While a preferred embodiment of the invention has been described, it should not be limited to any of these details except as defined by the following claims, which should be construed as broadly as the prior art will permit.

I claim:

1. A filter leaf comprising a frame, a reticulated member secured therein, a filter element on each side of said reticulated member, said frame being of S-shaped cross section whereby a peripheral groove is formed on both sides of the frame, and means comprising a packing element for clamping the edges of the opposed filter elements in the peripheral grooves, the top of the S-shaped frame being wider than the portion of said frame adjacent the filter, whereby the filter element will be protected.

2. A filter leaf comprising a frame, a reticulated member secured therein, a filter element on each side of the reticulated member, peripheral grooves on both sides of the frame, and a plurality of packing elements for clamping the edges of the opposed filter elements in the respective peripheral grooves, one packing element wedging the filter element directly against the groove and the other element wedging the free edge of the filter element against the first packing element.

3. In apparatus of the class described, a closed vertical filter, a plurality of spaced filter leaves mounted side by side in said filter, each of said leaves having distendable filter elements which are distended by "blowing back" to discharge filter cake, means for securing said filter elements to said leaves at spaced vertical and horizontal points, the vertical points being closer together than the horizontal points to avoid the formation of ledges during cake discharge and the securing means on one leaf being positioned at points intermediate the securing means of adjacent leaves to prevent entrapment of filter cake between distended portions of adjacent filter elements.

WILLIAM H. BACHELDOR.